United States Patent
Liu et al.

(10) Patent No.: US 8,089,229 B2
(45) Date of Patent: Jan. 3, 2012

(54) MOTOR DRIVING SYSTEM AND METHOD

(75) Inventors: Hsing-Chang Liu, Taipei Hsien (TW); Chien-Chung Wu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 459 days.

(21) Appl. No.: 12/399,035

(22) Filed: Mar. 6, 2009

(65) Prior Publication Data
US 2010/0164414 A1  Jul. 1, 2010

(30) Foreign Application Priority Data

Dec. 31, 2008 (CN) .......................... 2008 1 0306738

(51) Int. Cl.
*H02P 1/00* (2006.01)
(52) U.S. Cl. .................... 318/257; 318/600; 318/568.11

(58) Field of Classification Search .................. 318/257, 318/600, 568.11, 567, 569; 710/300, 100; 362/82
See application file for complete search history.

(56) References Cited

U.S. PATENT DOCUMENTS
7,088,137 B2 * 8/2006 Behrendt et al. ................ 326/46
\* cited by examiner

*Primary Examiner* — Karen Masih
(74) *Attorney, Agent, or Firm* — Altis Law Group, Inc.

(57) ABSTRACT

A motor driving system includes a storage unit, a driver, and a controller. The driver includes a first programmable logic device (PLD). The controller includes a second PLD. The storage unit stores a control program. The controller generates a first transmission data to the first PLD and a second transmission data to the second PLD according to the control program. The first PLD generates a first message packet including the first transmission data. The second PLC generates a second message packet including the second transmission data. The first and second PLDs communicate with each other using a full duplex transmission mode or a half duplex transmission mode.

11 Claims, 4 Drawing Sheets

MOTOR DRIVING SYSTEM AND METHOD

BACKGROUND

1. Technical Field

The present disclosure relates to driving systems and methods, and particularly, to a motor driving system and a motor driving method.

2. Description of Related Art

In a motor driving system including a controller and a driver, information or messages communicated between the controller and the driver, such as working current, working voltage, environment temperature, and so on, are critical for stably driving a motor. However, transmission of information between the controller and the driver is usually asynchronous. Accordingly, working status of the driver may not be transmitted to the controller.

DETAILED DESCRIPTION

Figure 1:
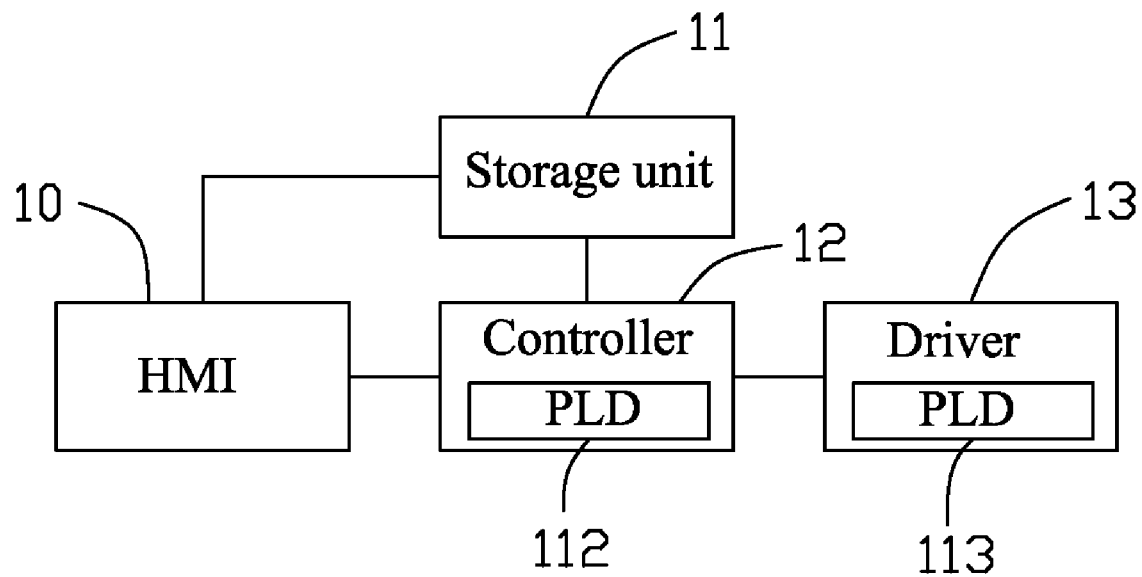
FIG. 1 is a block diagram of an exemplary embodiment of a motor driving system.

Referring to FIG. 1, an exemplary embodiment of a motor driving system includes a human machine interface (HMI) 10, a storage unit 11, a controller 12, and a driver 13 configured for driving a motor. The controller 12 and the driver 13 include a programmable logic device (PLD) 112 and a PLD 113 respectively. The number of the driver 13, the PLD 112, and the PLD 113 can be adjusted depending on the embodiment.

The storage unit 11 stores a control program input via the HMI 10. The control program stores a plurality of preset parameters for the driver 13, such as the working frequency and voltage of the driver 13. The controller 12 also includes a plurality of parameters, such as the working frequency and voltage of the controller 12. The controller 12 generates a first transmission data and a second transmission data according to the control program. The controller 12 transmits the first transmission data to the PLD 112. The controller 12 transmits the second transmission data to the PLD 113. The first and second transmission data can be adjusted according to the control program. The PLD 112 generates a first message packet based on the first transmission data and transmits the first message packet to the driver 13. The PLD 113 generates a second message packet including the second transmission data and transmits the second message packet to the controller 12. The first and second message packets are in form of a serial data transport protocol (SDTP). The controller 12 is configured for controlling the HMI 10 to display the working status of the driver 13 and the motor on a display of the HMI 10. Additionally, the controller 12 is further configured for determining if the first transmission data needs to be amended according to the control program in the storage unit 11. For example, when the pre-set transmission mode between the PLDS 112 and 113 in the control program changes from a full duplex transmission mode to a half duplex transmission mode, the controller 12 will amend the first and second transmission data accordingly.

Figure 2:
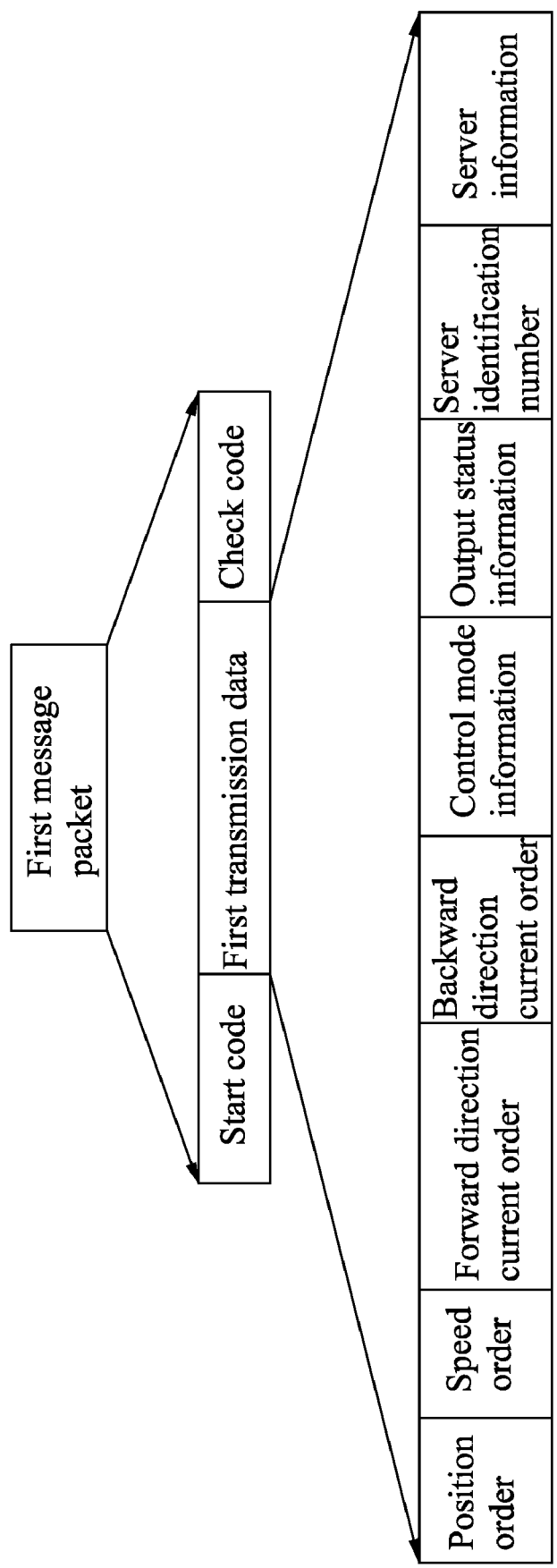
FIG. 2 is a schematic diagram of an exemplary embodiment of a first message transmission packet generated by a controller of the motor driving system of FIG. 1.

Referring to FIG. 2, the first transmission data includes a 16-bit start code, a 16-bit check code, a 32-bit position order, a 16-bit speed order, a 16-bit forward direction current order, a 16-bit backward direction current order, a 8-bit control mode information, a 8-bit output status information, a 16-bit server identification number, and a 32-bit server information. Thus, the first message packet has 176 bits. The start code indicates the protocol form of the first message packet. The check code is used for checking whether the first message packet is correct after transmitting the first message packet from the PLD 112 to the PLD 113.

The position order of the first transmission data is used for driving the driver 13 to detect a position of the rotor of the motor. The speed order is used for adjusting a rotation speed of the motor. The forward and backward current order are used for adjusting a rotation direction of the motor.

The control mode information of the first transmission data is used for determining a control mode of the driver 13 to drive the motor. The 8-bit control mode information includes 256 kinds of control modes. As an example, three of the control modes may be a position control mode, a speed control mode, and a torque control mode. The position and speed control modes can set a torque of the motor according to the decode values of the forward and backward current orders, or the maximum preset values of the torque. The torque control mode can set a working current of the motor according to the decode values of the forward and backward speed order, or the maximum preset values of the working current.

It may be understood that the control mode information may be in the form of a string of binary numbers, wherein at least a portion of the string of binary numbers determines control and status information of the driver 13. As an example, certain bits of the control mode information can be used for setting a control mode of the driver 13. In this embodiment, the first six bits of the control mode information are used for setting the control mode of the driver 13. Further details of the control mode will be described below.

In one of the two setting manners, for example, when the first six bits of the control mode information are set to 100000, the driver 13 drives the motor based on the position control mode and the working current of the motor can be the maximum preset value in the control program. When the first six bits are set to 010000, the driver 13 drives the motor based on the speed control mode, and the working current of the motor also can be the maximum preset value in the control program. When the first six bits are set to 001000, the driver 13 drives the motor based on the torque control mode, and the rotation speed of the motor still can be according to the maximum preset value in the control program.

For the other of the two setting manners, when the former six bits of the control mode information are set to 000100, for example, the driver 13 drives the motor based on the position control mode, and the working current of the motor can be determined by the forward or backward current orders. When the first six bits are set to 000010, the driver 13 drives the motor based on the speed control mode, and the working current of the motor can be determined by the forward or backward current orders. When the first six bits are set to 000001, the driver 13 drives the motor based on the torque control mode, and the rotation speeds of the motor can be determined by the speed order.

The output status information of the first transmission data is used for controlling status of the driver 13. The 8-bit output status information can include 256 kinds of control statuses.

In this embodiment, the first four bits of the output status information are used for setting a control status. For example, when the first four bits are set to 1000, the driver 13 is controlled to get ready for driving the motor. When the first four bits are set to 0100, the driver 13 is reset. When the first four bits are set to 0010, the driver 13 is controlled to stop the motor from rotating forward. When the first four bits are set to 0001, the driver 13 is controlled to stop the motor from rotating backward.

The server identification number is used for determining server identifications between the driver 13 and the controller 12. The 16-bit server identification number includes 65536 ($2^{16}$=65536) kinds of server identifications, which are communications categories between the controller 12 and the driver 13. The first five bits of server identification number can be used to set a server identification. In one example, when the first five bits are set to 10000, a correspondence between the controller 12 and the driver 13 is established. When the first five bits are set to 01000, all parameters of the controller 12 are written into the driver 13. When the first five bits are set to 00100, the controller 12 reads out all parameters of the driver 13. When the first five bits are set to 000010, the controller 12 reads out pre-set parameters of the driver 13 in the control program. When the first five bits are set to 00001, the controller 12 writes the preset parameters in the control program into the driver 13. The server information is used for storing parameters and address of parameters of each server identification.

Figure 3:
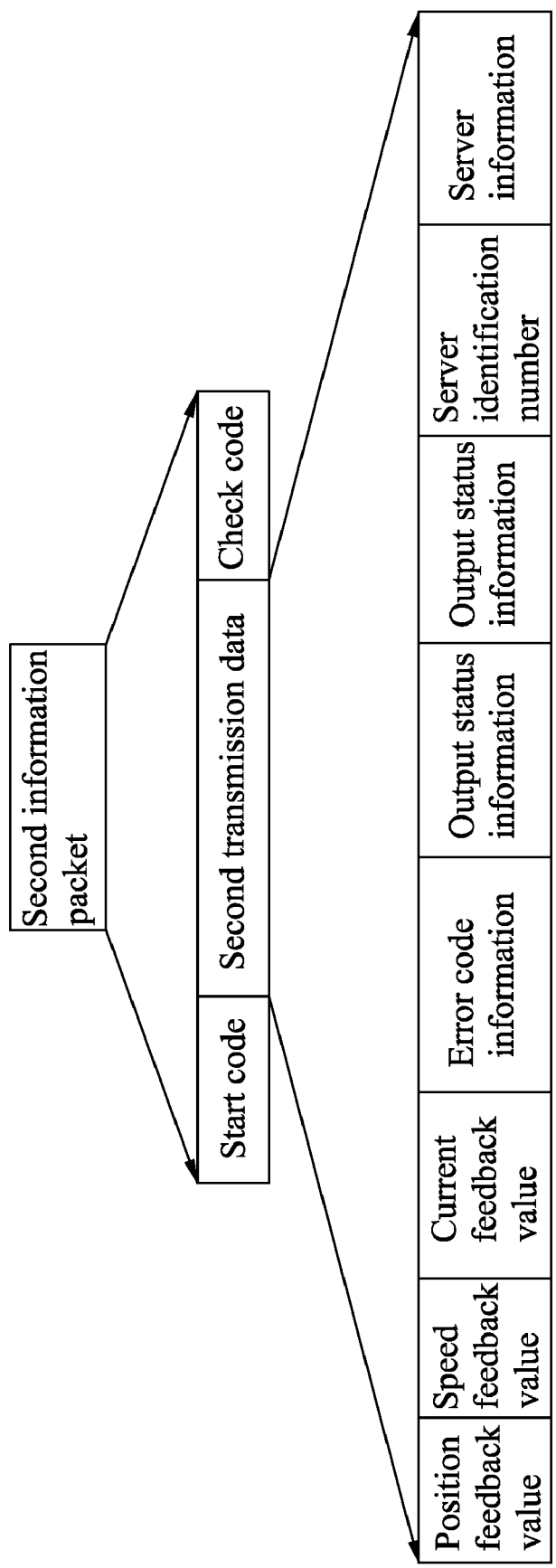
FIG. 3 is a schematic diagram of an exemplary embodiment of a second message transmission packet generated by a driver of the motor driving system of FIG. 1.

Referring to FIG. 3, the second transmission data includes a 16-bit start code, a 16-bit check code, a 32-bit position feedback value, a 16-bit speed feedback value, a 16-bit current feedback value, a 24-bit error code information, a 8-bit output status information, a 16-bit server identification number, and a 32-bit server information. Thus, the second message packet has 176 bits. The start code of the second transmission data indicates the protocol form of the second message packet. The check code of the second transmission data indicates whether the second message packet is valid after the second message packet transmitting from the PLD 113 to the PLD 112.

The position, speed, and current feedback values of the second transmission data correspond to the position, speed, and current orders of the first transmission data respectively. When the driver 13 drives the motor based on the position order, the driver 13 detects the position of the motor and transmits the detected position to the controller 12. The server identification number and the server information in the second transmission data correspond to server identification number and the server information in the first transmission data.

The output status information in the second transmission data indicates the working status of the motor. The first four bits of the output status information can be used to set the working status of the motor. As an example, the first four bits are set to 1000 to indicate that the motor is ready. When the first four bits are set to 0100, the rotation speed of the motor can be set to all values that are smaller than the maximum value stored in the control program. When the first four bits are set to 0010, the current forward can be set to all values that are smaller than the maximum value stored in the control program. When the first four bits are set to 0001, the current backward can be set to all values that are smaller than the maximum value stored in the control program.

The error code is used for indicating an error of the output status information of the driver 13 and the motor. The first nine bits of the output status information can be used to set the output status information of the driver 13 and the motor. As an example, the first nine bits of the output status information are set to 100000000 to indicate the temperature of the driver 13 is too high. As an example, the first nine bits of the output status information are set to 000000001 to indicate the rotating speed of the motor is too fast.

Because the first and second message packets have 176 bits in one example, transmitting time of the first and second message packets are, for example, 17.6 microseconds (us) if a 10 bits/us baud rate is used. If the delay of the transmission is 2.4 us, the first and second message packets can be transmitted five times for a 100 us sample interval, indicating five chances to correct errors in the transmission.

Figure 4:
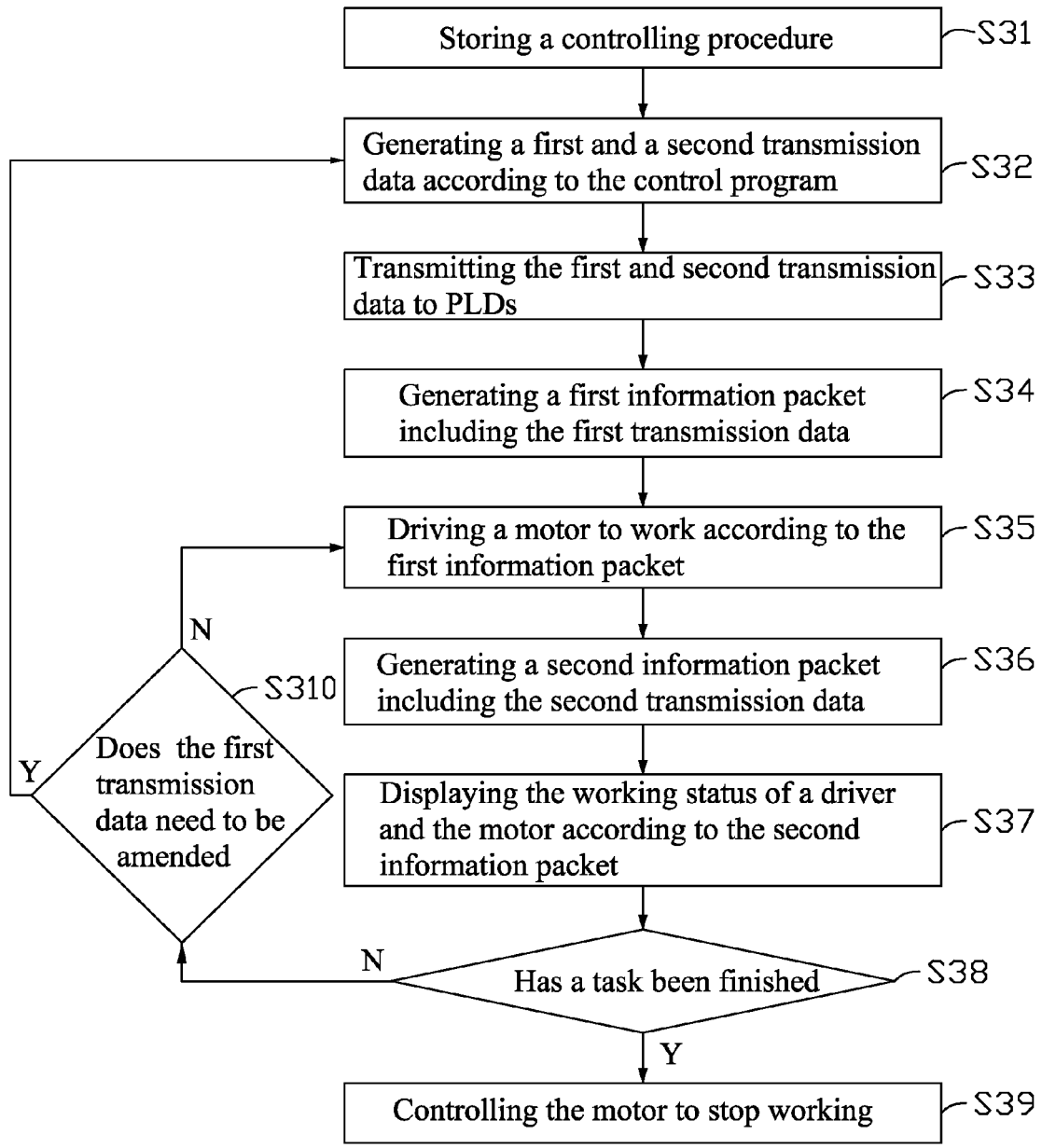
FIG. 4 is a flowchart of an exemplary embodiment of a motor driving method.

Referring to FIG. 4, an embodiment of a motor driving method includes following steps:

In step S31, the storage unit 11 stores a control program input via the HMI 10.

In step S32, the controller 12 generates a first and a second transmission data according to the control program, wherein the first and second transmission data can be adjusted according to the control program.

In step S33, the controller 12 transmits the first transmission data to the PLD 112, and transmits the second transmission data to the PLD 113.

In step S34, the PLD 112 generates a first message packet including the first transmission data in a form of SDTP.

In step S35, after the PLD 112 transmits the first transmission data to the PLD 113 of the driver 13, the controller 12 controls the driver 13 to drive a motor according to the first message packet.

In step S36, the PLD 113 generates a second message packet including the second transmission data in a form of SDTP, and transmits the second message packet to the controller 12.

In step S37, the HMI 10 displays the working status of the driver 13 and the motor for analysis.

In step S38, the controller 12 determines if a task, for example, a pre-set rotation cycle, for driving the motor is finished. If the task is finished, the procedure goes to step S39, otherwise the procedure goes to step S310.

In step S39, the driver 13 controls the motor to stop working.

In step S310, the controller 12 determines if the first transmission data needs to be amended according to the control program. If the first transmission data needs to be amended, the procedure returns to step S32, otherwise the procedure returns to step S35.

The foregoing description of the certain inventive embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skill in the art to which the present disclosure pertains without departing from its spirit and scope. Accordingly, the scope of the present disclosure is defined by the appended claims rather than the foregoing description and the embodiments described therein.

What is claimed is:

1. A motor driving system comprising:
a storage unit that stores a control program, the control program storing a plurality of parameters for a driver and a controller of a motor;
wherein the motor is driven by the driver, and wherein the driver comprises a first programmable logic device (PLD) used to generate a first message packet;
wherein the controller comprises a second PLD used to generate a second message packet, wherein the controller generates a first transmission data to the first PLD and a second transmission data to the second PLD according to plurality of parameters in the control program; and
wherein the first message packet comprises the first transmission data; the second message packet comprises the second transmission data, and wherein the first and second PLDs communicate with each other using a full duplex transmission mode or using a half duplex transmission mode.

2. The motor driving system of claim 1, wherein the first and second message packet each comprises a start code and a check code in form of a serial data transport protocol.

3. The motor driving system of claim 1 further comprising a human machine interface (HMI) to input the control program into the storage unit, and to display the working status of the driver and the motor.

4. The motor driving system of claim 2, wherein the start code and the check code of the first and second message packet each comprise sixteen bits.

5. The motor driving system of claim 1, wherein the first transmission data comprises a position order, a speed order, a forward direction current order, a backward direction current order, a control mode information, an output status information, a server identification number, and a server information, and wherein the second transmission data comprises a position feedback value, a speed feedback value, a current feedback value, a error code information, an output status information, a server identification number, and a server information.

6. The motor driving system of claim 5, wherein the position order, the speed order, the forward direction current order, the backward direction current order, the control mode information, the output status information, the server identification number, and the server information of the first transmission data comprise 32 bits, 16 bits, 16 bits, 16 bits, 8 bits, 8 bits, 16 bits, and 32 bits respectively, and wherein the position feedback value, the speed feedback value, the current feedback value, the error code information, the output status information, the server identification number, and the server information of the second transmission data comprise 32 bits, 16 bits, 16 bits, 24 bits, 8 bits, 16 bits, and 32 bits respectively.

7. A method for driving a motor comprising:
storing a control program in a storage unit, the control program storing a plurality of parameters for a driver and a controller of a motor;
generating a first transmission data and a second transmission data by the controller, wherein the first transmission data is transmitted to a first programmable logic device (PLD) of the controller, and wherein the second transmission is transmitted to a second PLD of the driver;
generating a first message packet comprising the first transmission data by the first PLD of the controller;
transmitting the first message packet to the second PLD of the driver
controlling the driver to drive the motor according to the first message packet;
generating a second message packet comprising the second transmission data by the second PLD of the driver; and
transmitting the second message packet to the first PLD of the driver.

8. The method of claim 7, wherein the first and second message packet each comprise a start code and a check code in form of a serial data transport protocol.

9. The method of claim 8, wherein the start code and the check code of the first and second message packet each comprise sixteen bits.

10. The method of claim 7, wherein the first transmission data comprises a position order, a speed order, a forward direction current order, a backward direction current order, a control mode information, an output status information, a server identification number, and a server information, and wherein the second transmission data comprises a position feedback value, a speed feedback value, a current feedback value, a error code information, an output status information, a server identification number, and a server information.

11. The method of claim 10, wherein the position order, the speed order, the forward direction current order, the backward direction current order, the control mode information, the output status information, the server identification number and the server information of the first transmission data comprise 32 bits, 16 bits, 16 bits, 16 bits, 8 bits, 8 bits, 16 bits, and 32 bits respectively, and wherein the position feedback value, the speed feedback value, the current feedback value, the error code information, the output status information, the server identification number and the server information of the second transmission data comprise 32 bits, 16 bits, 16 bits, 24 bits, 8 bits, 16 bits, and 32 bits respectively.

* * * * *